(12) United States Patent
Tengli

(10) Patent No.: US 8,185,528 B2
(45) Date of Patent: May 22, 2012

(54) ASSIGNING HUMAN-UNDERSTANDABLE LABELS TO WEB PAGES

(75) Inventor: Ashwin Tengli, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 676 days.

(21) Appl. No.: 12/144,036

(22) Filed: Jun. 23, 2008

(65) Prior Publication Data

US 2009/0319533 A1 Dec. 24, 2009

(51) Int. Cl.
*G06F 7/08* (2006.01)
(52) U.S. Cl. ...................................... 707/736
(58) Field of Classification Search .................. None
See application file for complete search history.

(56) References Cited

U.S. PATENT DOCUMENTS

| | | | |
|---|---|---|---|
| 7,058,633 B1 * | 6/2006 | Gnagy et al. | 1/1 |
| 7,398,461 B1 * | 7/2008 | Broder et al. | 715/208 |
| 7,516,397 B2 * | 4/2009 | Joshi et al. | 715/206 |
| 7,617,176 B2 * | 11/2009 | Zeng et al. | 1/1 |
| 7,680,940 B2 * | 3/2010 | Morris | 709/226 |
| 7,698,344 B2 * | 4/2010 | Sareen et al. | 707/767 |
| 7,720,830 B2 * | 5/2010 | Wen et al. | 707/705 |
| 7,725,318 B2 * | 5/2010 | Gavalda et al. | 704/251 |
| 7,739,286 B2 * | 6/2010 | Sethy et al. | 707/737 |
| 7,788,253 B2 * | 8/2010 | Grennan et al. | 707/709 |
| 2003/0221163 A1 * | 11/2003 | Glover et al. | 715/501.1 |
| 2004/0267724 A1 * | 12/2004 | Hoffman | 707/3 |
| 2006/0026496 A1 * | 2/2006 | Joshi et al. | 715/500.1 |
| 2006/0074898 A1 * | 4/2006 | Gavalda et al. | 707/4 |
| 2008/0040674 A1 * | 2/2008 | Gupta | 715/745 |
| 2008/0162425 A1 * | 7/2008 | Grennan et al. | 707/3 |
| 2008/0168049 A1 * | 7/2008 | Gao et al. | 707/5 |
| 2008/0172293 A1 * | 7/2008 | Raskin et al. | 705/14 |
| 2008/0228749 A1 * | 9/2008 | Brown | 707/5 |
| 2008/0243819 A1 * | 10/2008 | Sareen et al. | 707/5 |
| 2008/0244051 A1 * | 10/2008 | Morris | 709/223 |
| 2009/0063412 A1 * | 3/2009 | Harris et al. | 707/3 |
| 2009/0070320 A1 * | 3/2009 | Budynek et al. | 707/5 |
| 2009/0125501 A1 * | 5/2009 | Gao et al. | 707/5 |
| 2009/0198506 A1 * | 8/2009 | Gupta | 705/1 |
| 2010/0094859 A1 * | 4/2010 | Gupta | 707/709 |
| 2010/0161583 A1 * | 6/2010 | Sareen et al. | 707/706 |
| 2010/0281009 A1 * | 11/2010 | Wen et al. | 707/705 |

* cited by examiner

*Primary Examiner* — Hung Q Pham
*Assistant Examiner* — Hubert Cheung
(74) *Attorney, Agent, or Firm* — Stattler-Suh PC

(57) ABSTRACT

Methods and systems that label a web page by collecting a set of inbound labels for the web page, estimating a language model for the web page, computing the likelihood of generating each inbound label given the language model and assigning a score to each inbound label based on this likelihood, and assigning a label to the web page based on the score assigned to each of the set of inbound labels. Inbound labels are preferably collected from the set of web documents linking to the web page. Labels assigned are useful in providing labeled links to web pages from top hosts in search results pages.

19 Claims, 3 Drawing Sheets

ASSIGNING HUMAN-UNDERSTANDABLE LABELS TO WEB PAGES

BACKGROUND OF THE INVENTION

1. Field of the Invention

Embodiments of the invention relate to document description and more specifically to generating short labels for web documents.

2. Art Background

Web users often submit short queries intended to return the entry page for a topic or a host, while their real intention is to find a particular page in the host. For example, a user interested to buy computers from APPLE® might search only for "apple". If presented with URLs or snippets of popular pages in the apple.com domain the user would likely click directly on the link to the popular page they originally targeted. However, search result page (SRP) area is scarce and thus valuable, and showing lots of URLs, snippets and other text is often impractical.

A common solution is to provide "quicklinks" to popular pages in a host. These are text links, typically with short labels, that point to pages internal to the host. This tactic reduces the usage of SRP area while fulfilling the goal of limiting the steps a user has to take to reach their target. A number of commercial search engines, including GOOGLE® and YAHOO®, have implemented such "quicklinks".

SUMMARY OF THE INVENTION

Methods and modules consistent with embodiments of the present invention employ techniques based on language modeling and machine learning to assign short human-understandable labels to any webpage in a fast scalable way. Preferably these methods leverage anchor text from the web and/or search queries from search engine data logs. The use of these labels need not be restricted to search results and be employed in any context to summarize web pages and/or visualize web pages in a web site.

In a first aspect, some embodiments of the present invention relate to computer-implemented methods of labeling web pages based on inbound labels from the web that point to the web pages. Consistent with this aspect, a method of labeling a web page from a host comprises the following: estimating a language model for the web page, collecting a set of inbound labels for the web page, computing the likelihood of generating each inbound label given the language model and assigning a score to each inbound label based on this likelihood, and labeling the web page based on the score assigned to each of the set of inbound labels. Preferably the set of inbound labels are collected from the set of web documents linking to the web page on the web. Further, the web page is preferably labeled with the label assigned the highest likelihood score.

In a second aspect, some embodiments of the present invention relate to processing module for labeling web pages. Consistent with this aspect, an offline processing module implemented in a computer-readable medium labels web pages from a host. An exemplary offline processing module comprises a label collection element, a language model estimator, a computation element, and a label assignment element. The language model estimator is configured to estimate a language model for the web page. The label collection element is configured to collect a set of inbound labels for the web page, preferably from the set of web documents linking to the web page. The computation element is configured to compute the likelihood of generating each inbound label given the language model and to assign a score to each inbound label based on this likelihood. The label assignment element is configured to assign a label to the web page from the set of inbound labels based on the scores assigned to each inbound label.

In a third aspect, some embodiments of the invention relate to systems for providing labeled links to web pages from a top host in a search results page. For example, a system consistent with this aspect comprises an offline processing module that provides a set of labeled web pages from a host, an element configured to select a set of top web pages from the top host and an online module that publishes the labels of each of the top web pages of the top host in the search result for the top host. Preferably an offline processing module consistent with some embodiments of such systems is configured to provide labels for top web pages from top hosts by collecting a set of inbound labels for the web pages, estimating a language model for each web page, and assigning label to each web page based on a computation involving the language model.

DETAILED DESCRIPTION

Search Result Pages

Figure 1:
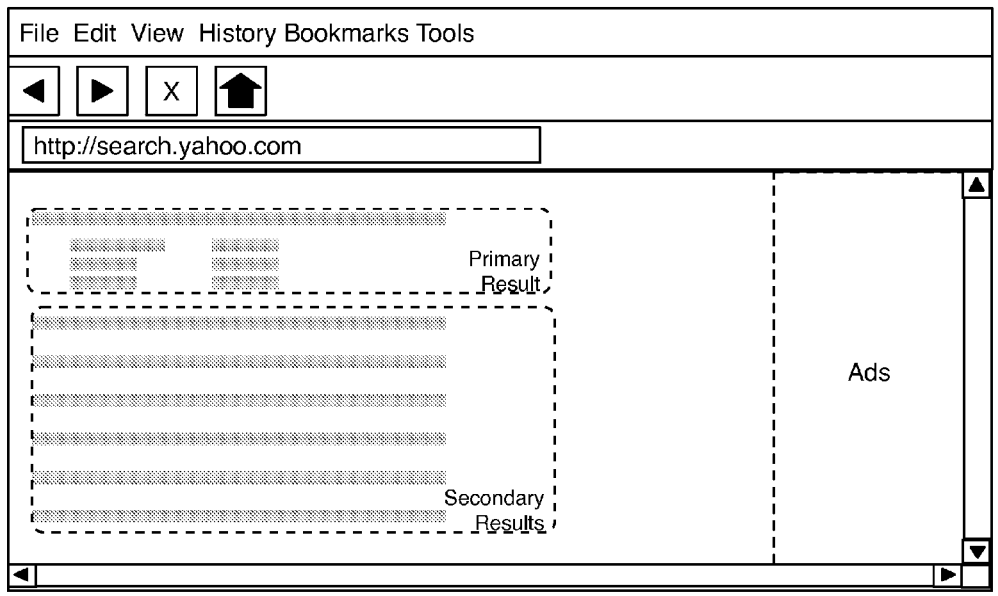
FIG. 1 is an exemplary search results page of a commercial search engine, which comprises algorithmic search results that include primary and secondary results and advertisements in various locations of the page.
Figure 2:
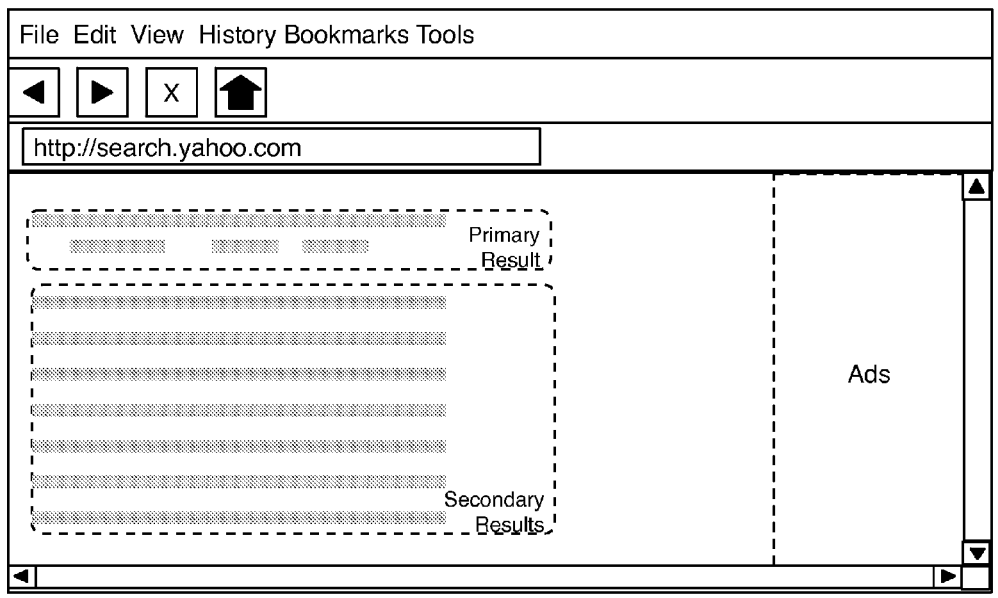
FIG. 2 is an exemplary search results page of a commercial search engine, which comprises algorithmic search results that include primary and secondary results and advertisements in various locations of the page.

Users of the Internet are familiar with typical commercial search engines. FIGS. 1 and 2 illustrate exemplary search results pages (SRP) returned by a commercial search engine in response to a query that contain primary and secondary results subsections. The right column of the page comprises advertisements. The left column of the page comprises algorithmic search results.

In both FIG. 1 and FIG. 2 the algorithmic results sections comprise primary result and secondary result subsections. A primary result subsection includes labeled links to internal web pages from the host of each result. Labeled are shown in SRPs as a link to the target web page, replacing or supplementing the page URL or page snippet. Preferably text for these labeled links is generated via methods consistent with the present invention, which produce a concise text for the labeled link.

SRP Generation

Figure 3:
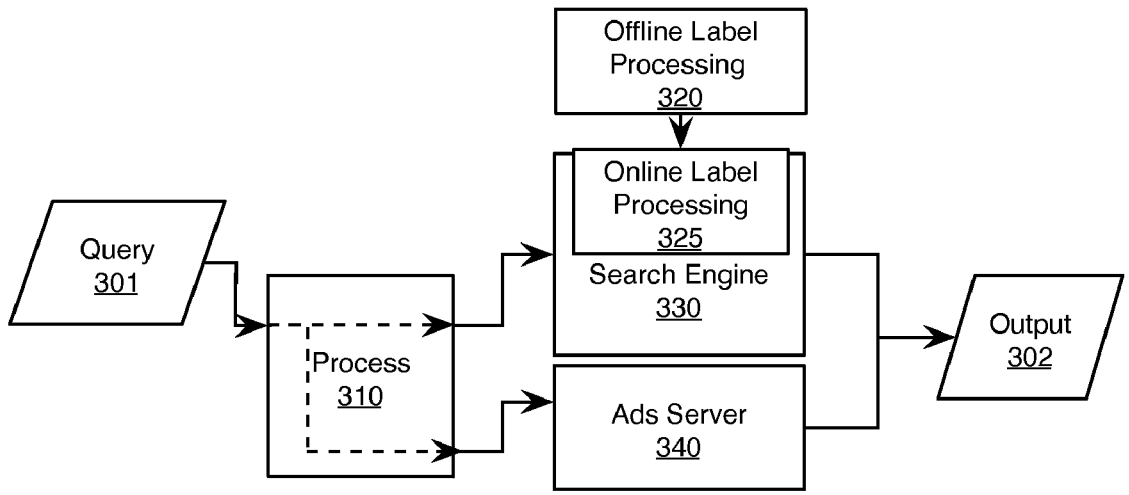
FIG. 3 is a diagram outlining backend processing steps required to produce a search results page with labels for web pages for some results including offline and online processing modules consistent with some embodiments of the present invention.

FIG. 3 shows a workflow by which an SRP is generated in response to a search query. First, a query 301 is received by process 310, which performs preprocessing operations to produce a processed query. Typical preprocessing operations include filtering, sanitization, stemming, stop-word removal, and canonical format conversion. The processed query is provided to two separate sub-process pipelines. The search engine pipeline 330 ranks all web content, which is usually referenced by a URL or URI on the World-Wide-Web, in order of relevance to the pre-processed query. This ranking forms the algorithmic search results set for query. The ads pipeline 340 ranks all available ads, either text-based or graphical, also in order of relevance to the pre-processed query.

In some embodiments of the present invention, a search engine pipeline includes elements configured to enhance certain search results by providing labeled links to some pages from the result hosts. The illustrated inclusion of offline 320 and online 325 label processing elements incorporated into the search engine pipeline 330 are consistent with some embodiments of the present invention.

An output SRP 302 delivered in response to the query draws on rankings produced by both the ads and search engine pipeline and on labels from the label processing elements of the search engine pipeline.

Labeling

Figure 4:
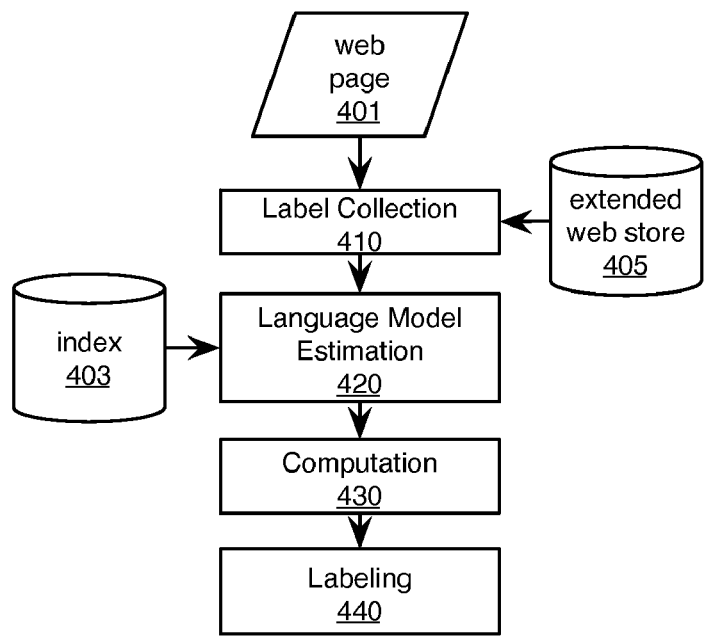
FIG. 4 is a diagram outlining a process of labeling a web page from a host consistent with some embodiments of the present invention.

FIG. 4 illustrates a processing module for labeling a web page 401 consistent with some embodiments of the present invention. The processing module includes a label collection element 410, a language model estimation element 420, a computation element 430 and a labeling element 440. Preferably the web page 401 is drawn from a portion of the web that has been indexed and stored by the search engine. Alternatively, a web page drawn from a non-indexed or non-stored portion of the web is preferably incorporated into a web index and an extended web store. Preferably the extended web store includes metadata about each web page in addition to page content and other document features. In either case, the processing module preferably uses the extended web store 405 and index 403 to obtain data.

Preferably the module employs a language-modeling framework that operates on the assumption that appropriate labels for a web page are generated from a language model of that page. Preferably page language models are estimated then used to rank candidate labels based on their likelihood of generation from the estimated language models.

Label Collection

The label collection element 410 collects a set of inbound labels for the web page 401. Preferably these candidate labels are from the set of web documents linking to the web page 401 in the extended web store 405. Preferred candidate labels include anchor text data from links inbound to the web page. In some embodiments, DELICIOUS® tags pointing to the web page are considered candidate labels. In these embodiments, the tags are imported into the extended web store 405 and then collected by the label collection element 410 or they are collected directly by the label collection element 410 from one or more other sources. In addition, in some embodiments user search queries that previously resulted in clicks-through to the web page are used as candidate labels. In these embodiments, search behavior history is preferably analyzed to provide candidate label data on web pages in a data structure separate from the extended web store 405 but preferably correlated to it, and from which labels are collected by the label collection element 410.

Language Model Estimation

The language model estimation element 420 estimates a language model for the web page 401. Preferably the module preferably implements an N-gram language model. N-gram language modeling techniques provide a level of complexity between simple methods like 'bag of words' and grammar based natural language processing methods. These techniques are grounded in statistical theory and have both estimable parameters and many empirical uses.

In some embodiments, an N-gram language model $\theta_D$ corresponds to a web page D. Let L be the label whose likelihood has to be estimated given the page D. The likelihood of a label given $\theta_D$ is given by:

$$P(L|\theta_D) = P(l_1 l_2 \ldots l_n | \theta_D)$$

Where $l_1 l_2 \ldots l_n$ is the sequence of words in the label L. Then, assuming words are generated from a Markovian system, $$P(l_1 l_2 \ldots l_n | \theta_D) = P(l_1 | \theta_D) P(l_2 | l_1, \theta_D) P(l_3 | l_2, l_1, \theta_D) \ldots$$
$$P(l_n | l_{n \wedge 1}, l_{n \vee 2} \ldots l_0, \theta_D)$$
$$= \prod_i P(l_i | l_{i-1} \ldots l_0, \theta_D)$$

Or, representing $l_{i-1} \ldots l_0$ as $l_h^i$ $$P(l_1 l_2 \ldots l_n | \theta_D) = \prod_i P(l_i | l_h^i, \theta_D)$$

The model bias towards length of history $l_h$ will depend on the type of N-gram model used, e.g. unigram, bigram.

Preferably the language model estimation element 420 learns language model parameters by maximum likelihood estimation. In some embodiments, language models are smoothed following initial parameter estimation to permit use of training data that doesn't cover all possible observations.

Consistent with embodiments of the present invention, language models are estimated by the language model estimation element 420 for one or more linguistic associates of the web page 401. Such associates include: title and header data of the web page, content of the web page 401, and the candidate labels of the web page 401. In some embodiments of the present invention data for these associates is obtained from a variety of sources. In some embodiments candidate labels are obtained from the label collection element 410. In some embodiments web page title, header, and content data are obtained from the 403. In some embodiments labels are obtained directly from a extended web store.

Computation

The computation element 430 computes the likelihood of generating each inbound label given the language model and assigns a score to each inbound label based on this likelihood. In the case where a single language model is estimated, the computation element proceeds by direct computation of the likelihood of each label as given in the first equation above. The score assigned in this case is then based on the computed likelihood.

When multiple language models are estimated, likelihood computation in the computation element 430 preferably proceeds by using a combination of the language models. For example, when a different language model is estimated for each of the linguistic associates of the web page 401, at least three language models are produced. Further, some embodiments estimate multiple types of language model for each linguistic associate, e.g. bigram, unigram, and trigram models based on each associate. Together, estimating multiple types of model for multiple associates gives a large range of language models for the web page 401. Preferred methods of computation combining multiple models include interpolation and meta-classifier learning methods.

Interpolation

Preferably interpolated computations proceed by modeling label generation as a discrete hidden Markov model (HMM) dependent on the web page 401. Words constitute output symbols of the HMM. Together the multiple language models constructed for each web page form the states of the HMM; thus a given web page has a corresponding HMM.

Computationally, the HMM is used to model likelihood of a label by traversing a random sequence of states and at each state producing a word according to the output distribution of the state. The output probabilities for each state need not be learned; instead maximum likelihood estimates of the language models can be used. Further, in some embodiments where labels are estimated for multiple web pages, all the web-page based HMMs are assumed to have same transition probabilities. In this case the transition probabilities of the HMMs for all the web pages can be learned by global Expectation-Maximization (EM) estimation.

Preferably the computation element 430 defines total probability of an observation as a linear interpolation of the observation probabilities of the component language models. In this case the interpolation parameters are the transition probabilities of the model. The likelihood of a label in this model is computed as follows:

$$P(L|\theta_D) = P(l_1 l_2 \ldots l_n | \theta_D) = \Pi_i \{\Sigma_k \lambda_k P_k(l_i | l_h, \theta_D)\}$$

Where each k is a different language model, $\lambda_k$ is the interpolation weight (here the transition probability in the HMM) and $P_k$ is the kth language model.

EM based estimation of parameters preferably proceeds by using the set of candidate inbound labels for the web page 401. In some embodiments some subset of that set of candidate labels is used, preferably the subset used is a subset of "good" labels as verified by some external process (e.g. human validation of training data). In the subset case, computation assumes that only the subset-member candidate labels are generated from the web page language models and rest of the candidate set is noise. The full set case assumes that all the candidate labels are generated from language models.

Meta-Classifier

The meta-classifier computation approach proceeds by considering each language models as a classifier. For any candidate label each one of them predicts the likelihood of the label given the web page 401. A meta-classifier uses the probabilities predicted from individual classifiers as features for classification. Training data for such a meta-classifier is preferably provided via a subset of candidate labels that are "good" and "bad" as verified through some external process (e.g. by human validation).

Label Assignment

The label assignment element 440 is configured to assign a label to the web page 401 from the set of inbound labels based on the scores assigned to each inbound label by the computation element 430.

Implementation

Figure 5:
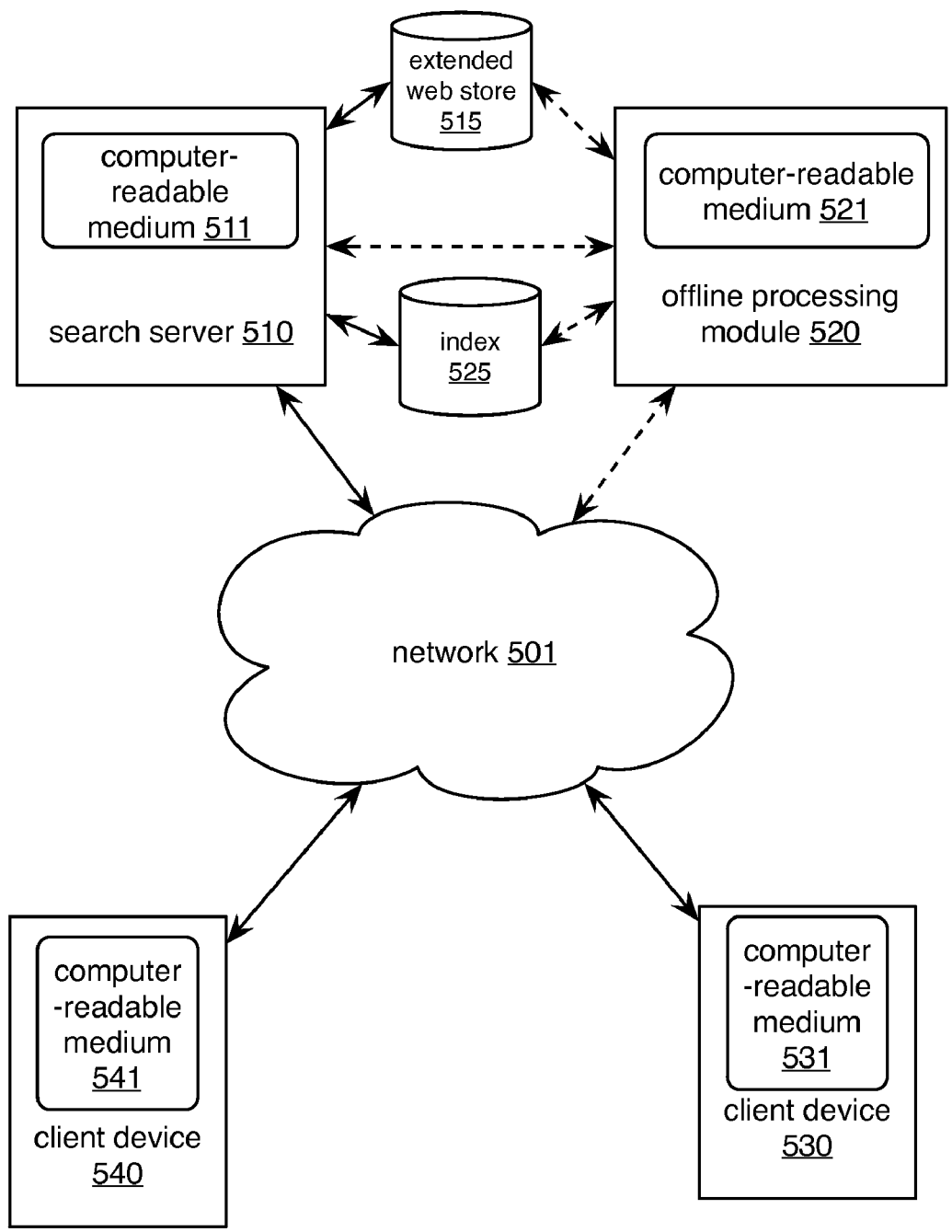
FIG. 5 illustrates a system capable of implementing a web page labeling system consistent with some embodiments of the present invention.

FIG. 5 illustrates a system supporting implementations of embodiments of the present invention. The system includes a search server 510, and offline processing module 520, client devices 530 and 540, and a network 501. Preferably network 501 is the Internet.

Server and client devices 510, 520, 530 and 540 include computer-readable media, 511, 521, 531, and 541 respectively, such as random access memory. The devices 510, 520, 530 and 540 execute instructions stored in media 511, 521, 531, and 540. Servers 510 and 520 additionally use extended web store 515 and index store 525 respectively. Likely client devices include personal computers, mobile devices, and networked content players. Servers may be implemented as networks of computer processors or as single devices.

Search server 510 receives label information from offline processing module 520, preferably asynchronously with label-based SRP generation. Offline processing module 520 communicates with search server 510, with network 501, and with index 525 and extended web store 515 stores to gather web page and candidate label information, to compute label probabilities, and to assign labels to web pages.

At SRP serving time a client user, e.g. of device 530 or 540, enters a query with a search engine that results in generation of an SRP by search server 510. When search engine 510 determines that an SRP includes a primary results section, the search engine 510 uses label data provided by the offline processing module 520.

Advantages

Methods and systems consistent with the present invention solve the problems of assigning human understandable labels to web pages in a fast and scalable way. This permits assignment of labels to any web page and enables insertion of short labeled links in SRPs for any web host. In addition, embodiments that employ inbound labels from the web leverage human generated web content while embodiments that employ search history leverage human generated search content. Search activity and web content production activity provide label texts with relatively different production timescales.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A computer-implemented method of labeling a web page from a host, comprising:
   a. estimating a language model comprising an association of words from content of the web page;
   b. collecting, from a set of web documents linking to the web page, a set of inbound labels for the web page, the set of inbound labels comprises data from an anchor text of a link to the web page on at least one web document of the set of web documents and text of a search query that results in a click-through to the web page;
   c. computing a likelihood of generating each inbound label from the collected set of inbound labels for the web page given the estimated language model and assigning a score to each inbound label based on the computed likelihood; and
   d. assigning a label to the web page used on a search results page that returns the web page based on the assigned score to each inbound label from the collected set of inbound labels for the web page.

2. The computer-implemented method of claim 1, wherein a set of language models are estimated for each web page.

3. The computer-implemented method of claim 2, wherein the computing the likelihood of generating each inbound label proceeds via interpolation between language models in the set of language models.

4. The computer-implemented method of claim 2, wherein the computing the likelihood of generating each inbound label proceeds via forming a meta-classifier based on the set of language models.

5. The computer-implemented method of claim 2, wherein the estimated language model for the web page incorporates the set of inbound labels for the web page.

6. The computer-implemented method of claim 1, wherein the collected set of inbound labels includes text obtained from tags associated with the web page on social-tagging sites.

7. An offline processing module, comprising at least one processor and memory, for labeling a web page from a host, comprising:
   a. a label collection element configured to collect, from a set of web documents linking to the web page, a set of inbound labels for the web page, the set of inbound labels comprises data from of an anchor text of a link to the web page on at least one web document of the set of web documents and text of a search query that results in a click-through to the web page;
   b. a language model estimator configured to estimate a language model comprising an association of words from content of the web page;
   c. a computation element configured to compute a likelihood of generating each inbound label from the collected set of inbound labels for the web page given the estimated language model and to assign a score to each inbound label based on the computed likelihood; and
   d. a label assignment element configured to assign a label to the web page from the collected set of inbound labels for the web page based on the assigned score to each inbound label, the assigned label used on a search results page that returns the web page.

8. The offline processing module of claim 7, wherein a set of language models are estimated for each web page.

9. The offline processing module of claim 8, wherein the computing the likelihood of generating each inbound label proceeds via interpolation between language models in the set of language models.

10. The offline processing module of claim 8, wherein the computing the likelihood of generating each inbound label proceeds via forming a meta-classifier based on the set of language models.

11. The offline processing module of claim 8, wherein the estimated language model for the web page incorporates the set of inbound labels for the web page.

12. The offline processing module of claim 7, wherein the collected set of inbound labels includes text obtained from tags associated with the web page on social-tagging sites.

13. A system, comprising at least one processor and memory, for providing labeled links to top web pages from a top host in a search results page, comprising:
   a. an offline processing module configured to provide labels for the top web pages from the top host by collecting a set of inbound labels for the top web pages, estimating a language model comprising an association of words from content of each top web page, and assigning a label to each top web page based on a computation involving the estimated language model, the collected set of inbound labels for the top web pages comprises data from an anchor text of a link to each top web page on at least one second top web page and text of a search query that results in a click-through to each top web page;
   b. an element configured to select a set of top web pages from the top host; and
   c. an online module that publishes the provided labels from the collected set of inbound labels for the top web pages of each of the top web pages of the top host in the search results page for the top host.

14. The system of claim 13, wherein the computation involving the estimated language model finds a likelihood of generating each inbound label from the collected set of inbound labels for the top web pages given the estimated language model and assigns a score to each inbound label based on the found likelihood.

15. The system of claim 14, wherein a set of language models are estimated for each top web page.

16. The system of claim 15, wherein the computation involving the estimated language model finds the likelihood proceeds via interpolation between language models in the set of language models.

17. The system of claim 15, wherein the computation involving the estimated language model finds the likelihood proceeds via forming a meta-classifier based on the set of language models.

18. The system of claim 15, wherein the estimated language model for the top web pages incorporates the set of inbound labels for the top web pages.

19. The system of claim 13, wherein the collected set of inbound labels includes text obtained from tags associated with the top web pages on social-tagging sites.

* * * * *